United States Patent [19]

Lyman

[11] 4,147,396
[45] Apr. 3, 1979

[54] HIGH SPEED ROTOR SYSTEM

[75] Inventor: Joseph Lyman, Kennebunk, Me.

[73] Assignee: Cambridge Thermionic Corporation, Cambridge, Mass.

[21] Appl. No.: 770,531

[22] Filed: Feb. 22, 1977

[51] Int. Cl.² .................................................. F16C 39/00
[52] U.S. Cl. ................................................................ 308/10
[58] Field of Search .................. 308/10; 318/138, 254; 310/156

[56] References Cited

U.S. PATENT DOCUMENTS

| 3,565,495 | 2/1971 | Lyman | 308/10 |
| 3,761,148 | 9/1973 | Grosbard | 308/10 |
| 3,779,618 | 12/1973 | Soglia et al. | 308/10 |
| 3,954,310 | 5/1976 | Rava | 308/10 |

*Primary Examiner*—Herman Hohauser
*Attorney, Agent, or Firm*—Thomas M. Ferrill, Jr.

[57] ABSTRACT

A magnetically suspended rotor system is provided capable of operating at rotational speeds of 100,000 rpm or greater. The system comprises a rotor assembly and electric motor means for producing rotation of the assembly about an axis thereof. Electromagnetic means disposed near one end of the rotor is energized to exert an attractive force on the rotor to support it and preferably cooperates with permanent magnet means affixed to the rotor assembly near one (the upper) end thereof. An additional permanent magnet affixed to the rotor near the opposite (lower) end thereof cooperates with another permanent magnet disposed in juxtaposition thereto to exert an attractive force on the rotor tending to oppose the force exerted by electromagnetic means and produces a radial constraining force on the rotor tending to center the lower end of the rotor assembly. A conductive element is interposed between the lower end of the rotor assembly and the latter permanent magnet which cooperates with the magnetic field produced by the permanent magnet in the lower end of the rotor assembly to inhibit nutation of the lower end of the rotor assembly by virtue of eddy currents induced therein. Means are provided responsive to displacement of the rotor in the direction of its axis of rotation for controlling the currents supplied to the electromagnetic means so as to tend to restore the rotor to its position prior to such displacement. The rotor may be driven by a motor utilizing regenerative commutation of the sort disclosed in co-pending application Ser. No. 695,507, filed June 11, 1976. The system disclosed makes possible the achievement of unusually high rotational speeds by minimizing or eliminating undesired resonances in the rotor assembly.

11 Claims, 3 Drawing Figures

HIGH SPEED ROTOR SYSTEM

This invention relates to improvements in magnetically suspended rotor systems, and particularly to such systems capable of operating at extremely high rotational speeds — i.e., of the order of 100,000 rpm or greater. Such rotor systems are particularly useful in applications such as turbo-pumps, ultra-centrifuges, momentum storage systems, systems for testing and balancing rotating objects, laser scanners and the like.

In the past considerable difficulties have been experienced in attempting to construct such systems capable of operating at extremely high speeds. One of the problems was that of providing a suitable drive motor capable of accelerating the rotor to high rotational speeds. Thus, if the rotor was made an element of an induction motor, large temperature rises were experienced in the rotor such that heat dissipation from the rotor became a limiting factor. This difficulty was overcome by using a special form of motor system employing regenerative commutation, as disclosed and claimed in co-pending application of Joseph Lyman, Ser. No. 695,507, filed June 11, 1976.

Another difficulty experienced was that of undesired resonances which tended to occur in the rotor and which tended to interfere with the acceleration of the rotor to the desired high rotational speed. The present invention is particularly concerned with overcoming this latter difficulty.

Accordingly it is an object of the invention to provide a magnetically suspended rotor system in which the rotor can be caused to rotate at extremely high speeds — i.e., of the order of 100,000 rpm or greater.

Another object of the invention is to provide a system in which undesired resonances of the rotor system are substantially eliminated.

A further object of the invention is to provide such a system in which undesired nutation of the rotor is substantially eliminated.

In accordance with the invention, the foregoing objects and others which will appear are achieved, in a magnetically suspended rotor system comprising a magnetically permeable rotor and electric motor means for producing rotation of said rotor about an axis thereof, by providing:

(a) electromagnetic means disposed near one end of said rotor, which is energized in response to electric current supplied thereto to exert an attractive force on said rotor to support it, (b) a first permanent magnet affixed to said rotor near the opposite end thereof and polarized in a direction substantially parallel to the axis of rotation of the rotor, (c) a second permanent magnet disposed in juxtaposition to said first magnet and polarized so as to cooperate with said first magnet and exert an attractive force on said rotor tending to oppose the force exerted by said electromagnetic means, (d) means responsive to displacement of said rotor in the direction of its axis of rotation for controlling the current supplied to said electromagnetic means so as to tend to restore said rotor to its position prior to such displacement, and (e) a conductive element positioned between said first and second electromagnets so as to have eddy currents induced therein upon the occurence of any nutation of said opposite end of said rotor relative to said second permanent magnet, whereby said nutation is effectively damped.

The invention will be fully understood from consideration of the following detailed description thereof with reference to the accompanying drawings in which.

Figure 1:
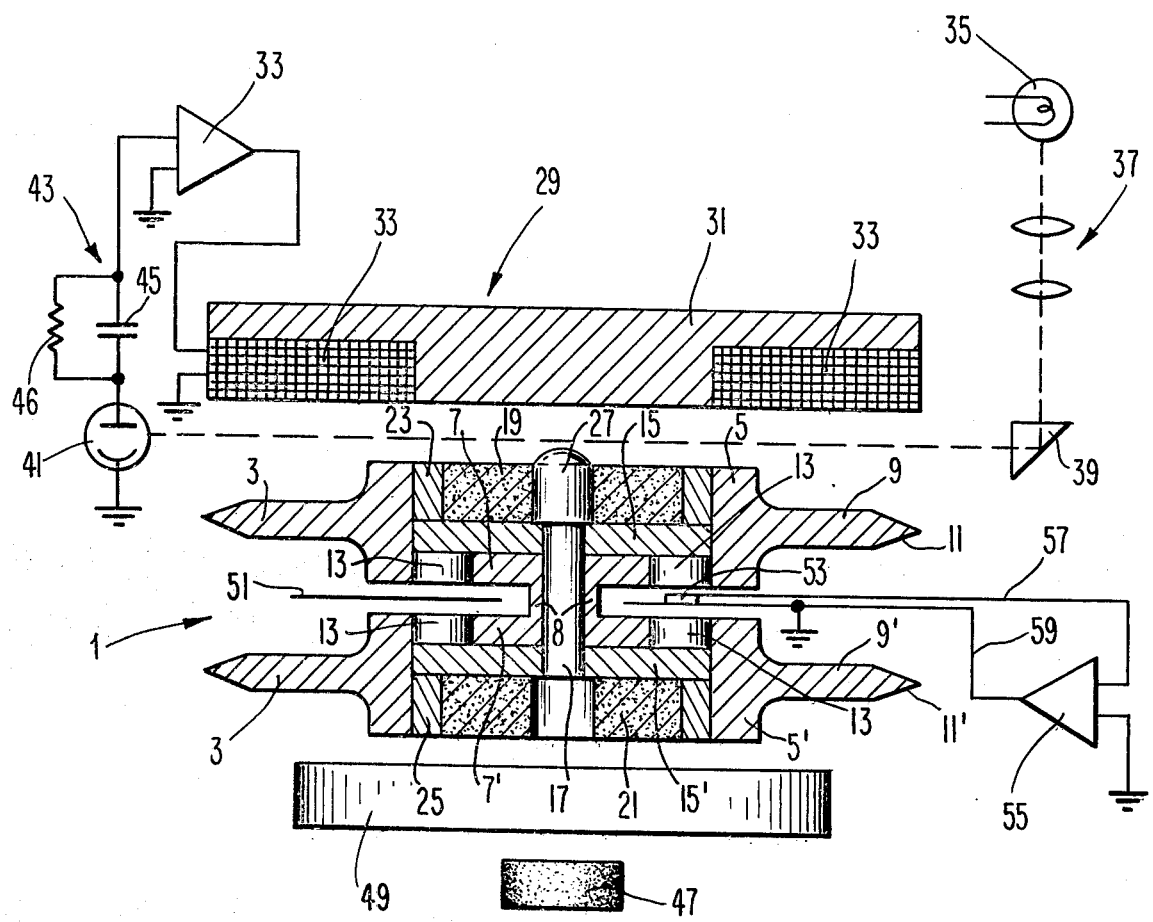
FIG. 1 is a view in elevation and partially in section illustrating a preferred embodiment of the invention.

Referring now to FIG. 1, the high speed rotor system there shown comprises a rotor assembly 1 including a unitary main body portion 3 in the form of a solid of revolution having two circumferential ring portions 5 and 5' coaxially disposed and vertically spaced from each other, central web portions 7 and 7' joined to the inner circumferential surfaces of ring portions 5 and 5' respectively and each having a thickness vertically which may be of the order of one-quarter the vertical thickness of the ring portions 5 and 5'. The two web portions are interconnected by a tubular central portion 8. Extending from the outer circumferential surfaces of ring portions 5 and 5' are relatively thinner circumferential extensions 9 and 9', each of which may have a vertical thickness of the order of one-quarter the vertical thickness of ring portions 5 and 5', which function to increase the moment of inertia of the over-all rotor assembly. The outer portions 11 and 11' of ring portions 5 and 5' are tapered to distribute stresses created at the high speeds of rotation of the rotor assembly.

Figure 2:
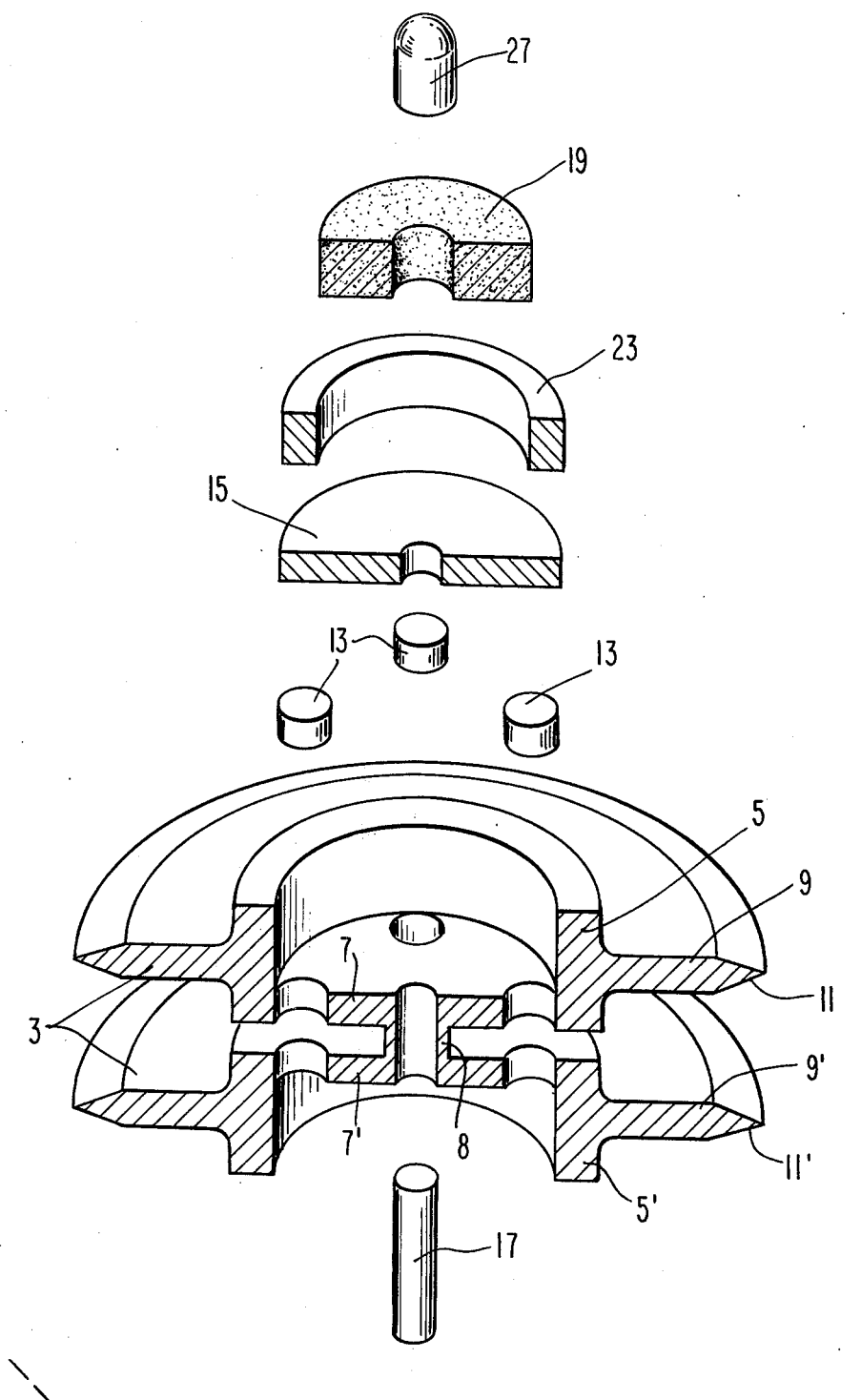
FIG. 2 is an exploded perspective view, partially in section, showing various components of the apparatus according to FIG. 1.

Each of the web portions 7 and 7' is provided with four equally circumferentially spaced vertical holes extending vertically therethrough and positioned adjacent the inner circumferential surfaces of ring portions 5 and 5', as shown more clearly in the exploded view of FIG. 2. In these holes are inserted axially polarized permanent magnets 13 which, as will be explained hereinafter, cooperate with suitable windings to provide motor means for causing the rotor assembly to rotate. The entire main body 3 of the rotor may be machined in a single piece from a suitable non-magnetic material, preferably of high tensile strength, such as non-magnetic stainless steel, such steel commercially designated as being particularly suited for this purpose. As explained in my co-pending application Ser. No. 695,507, filed June 11, 1976 for Electric Motor System, permanent magnets 13 preferably may be made of a suitable rare earth alloy such as samarium cobalt.

Positioned respectively above and below web portions 7 and 7' and immediately adjacent thereto are discs 15 and 15' of magnetically permeable material, such as ordinary cold-rolled steel, the vertical thickness of each disc being of the order of one-quarter the vertical thickness of ring portions 5 and 5' and their diameters being substantially equal to the internal diameter of the inner circumferential surfaces of said ring portions. Each disc is provided with a central hole aligned with a similar hole in the main body 3 through which is inserted a pin 17, also of magnetically permeable material such as cold-rolled steel for magnetically interconnecting discs 15 and 15'.

Figure 3:
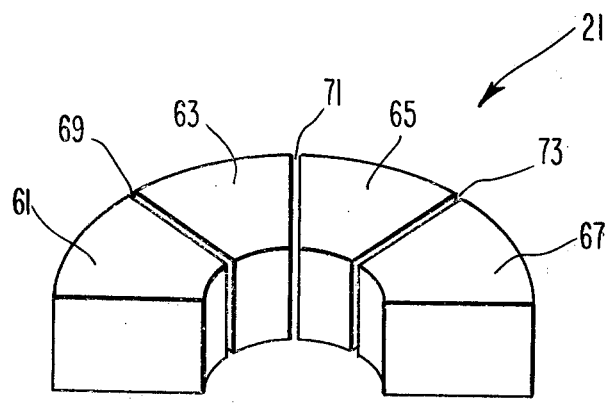
FIG. 3 is a perspective sectional view showing a preferred detailed structure which may be used for one or more of the magnets of the apparatus of FIGS. 1 and 2.

Directly above disc 15 is positioned an annular permanent magnet 19 which also may be formed of a rare earth magnetic alloy such as samarium cobalt, the external diameter of magnet 19 being somewhat less than the internal diameter of ring portion 5. Into the space between the outer periphery of magnet 19 and the inner surface of ring portion 5 is inserted a retaining ring 23, the purpose of which is to centrally position annular magnet 19 and counteract any tendency for it to rupture by reason of the high speed of rotation of the rotor assembly. Another similar annular permanent magnet 21 is positioned immediately below and adjacent the lower disc 15 and is provided with a similar retaining ring 25 which performs the same function as ring 23. Retaining rings 23 and 25 may be made of any suitable high tensile strength non-magnetic material such as aluminum or an aramide resin such as Kevlar-49 sold by E. I. DuPont de Nemours. Discs 15 and 15' provide low-reluctance magnetic paths between magnets 13 and magnets 19 and 21 respectively. If desired either or both of permanent magnets 19 and 21 may be modified in the manner shown in FIG. 3 by cutting them into a plurality, e.g. eight, of segments 61, 63, 65, 67 by making radial cuts 69, 71, 73 preferably at equally spaced intervals, through the body thereof before they are assembled into the rotor assembly. This modification has the advantage of reducing or eliminating "hoop" or tangential stresses in the magnets which may occur at high speeds of rotation and reduces the likelihood of rupture thereof at such speeds. Inserted in the vertical central hole in magnet 19 is an insert 27 of aluminum or other non-magnetic material having a slightly rounded surface at its upper end, the function of which will be explained hereinafter.

Positioned concentrically above and spaced from the upper surface of rotor assembly 1 is a support electromagnet assembly comprising a core 31 of suitable magnetically permeable material such as cold-rolled steel and an encircling winding 33, which in a typical embodiment of the invention comprised 330 turns of No. 20 wire. As shown, this support electromagnet assembly is of "pancake" configuration having a diameter considerably greater than its vertical thickness, which has been found to be particularly desirable in certain applications of the high speed rotor system for conservation of space, and also because it is essentially coextensive with the upper portion of the rotor assembly and therefore tends to provide substantial lateral restraint or centering force for the rotor assembly in addition to providing the desired upward force on the rotor assembly for supporting it.

Current for energizing winding 33 of support electromagnet 29 is supplied by a suitable amplifier 33 which is so designed as to supply a constant direct current sufficient to cause support electromagnet 29 to produce a magnetic flux sufficient to cooperate with the flux produced by permanent magnet 19 to provide the necessary over-all force needed to support rotor assembly 1. At the same time, the provision of the permanent magnet 19 in the rotor assembly itself, reduces the amount of energy required to be supplied to winding 33 to provide such support. In addition, means are provided for controlling amplifier 33 so as to compensate any tendency for rotor assembly 1 to become displaced either upward or downward along its vertical axis from its normal position.

While various arrangements may be used to achieve this result, in the embodiment illustrated such control is provided by means of an electrooptical system comprising a light source 35, a collimating lens system 37, prism 39, a photoelectric cell 41 and an integrating circuit 43 comprising the parallel combination of a capacitor 45 and a resistor 46. In this arrangement any vertical displacement of rotor assembly 1 will produce a variation in the amount of light reaching photoelectric cell 41 from light source 35 as the rounded upper portion of insert 27 moves into or out of the path of the light beam from prism 39 to photocell 41. As a result, the output from photocell 41 will vary in response to the vertical displacement of the rotor assembly and this output is partially integrated in integrator circuit 43 to yield a signal which varies in response to both the displacement and the rate of displacement of rotor assembly 1, which in turn is supplied to the input of amplifier 33 to control the current supplied by it to winding 33 so as to compensate for any tendency of the rotor assembly to become displaced either upward or downward from its normal operating position. It will be apparent that other systems may be employed for controlling the current in winding 33. For example, a system employing a laser beam rather than a light beam may by advantageous in some instances.

Concentrically positioned below rotor assembly 1 is a further permanent magnet which is axially polarized and of such strength that in cooperation with magnet 21 in the rotor assembly it exerts a small downward force on the rotor assembly, by virtue of which and by virtue of the fringing fields produce between these two magnets a radial constraining force is produced tending to center the lower end of the rotor assembly. Like permanent magnets 19 and 21 in the rotor assembly, magnet 47 may be made of a rare earth alloy such as samarium cobalt.

Further there is interposed between the lower end of the rotor assembly and permanent magnet 47 a disc 49 of a highly conductive metal such as copper. This cooperates with the magnetic field produced by permanent magnet 21 in the rotor assembly so that whenever any nutation of the lower part of the rotor assembly tends to occur, eddy currents will be induced in conductive element 49 so as to cause any such nutation to be damped out.

The means for producing rotation of the rotor assembly in the system according to the present invention preferably may be an electric motor system employing regenerative commutation as fully described in my aforementioned co-pending application Ser. No. 695,507. Accordingly it is not deemed necessary to describe such a motor system in detail in the present application. Briefly, as explained in said prior application, such a motor system comprises a rotor including magnetic means providing a plurality of correspondingly directed magnetic poles angularly displaced around said rotor, a stator comprising first and second windings adapted to cooperate with the poles of said rotor, each of said windings having transversely disposed conductive portions for intercepting the magnetic fields of said poles during rotation of said rotor, and an amplifier having its input coupled to said first winding so as to be energized by alternating voltage induced in said first winding during rotation of said rotor, and having its output coupled to said second winding to supply alternating current therethrough in synchronism with the interception of the magnetic fields of said poles by the transverse portions of said second winding. Also means may be provided for initiating rotation of the rotor, which may comprise Hall effect sensors disposed adjacent the transverse portions of the first winding, the outputs of which are combined and supplied to the input of the amplifier to cause alternating current to be supplied to the second winding to initiate rotation of the rotor. Such means are disclosed only schematically in FIG. 1, the stator windings being indicated at 51 and cooperating with magnetic poles provided by permanent magnets 13 in the rotor assembly. The Hall effect sensors for initiating rotation of the rotor are shown at 53 and the amplifier for controlling energization of the stator driving coil is shown at 55, being supplied with input through connection 57 and supplying its output to the stator driving coil through connection 59.

In operation of the system hereinbefore descrbed, the electromagnet assembly 29 cooperates with permanent magnet 19 in the upper end of rotor assembly 1 to support the rotor assembly in a position intermediate electromagnet assembly 29 and the disc of conductive material 49 so that the rotor assembly is free to rotate substantially free of any friction. If desired, the entire system may be enclosed in an evacuated enclosure (not shown) so that friction caused by the surrounding atmosphere also may be eliminated or substantially reduced. Permanent magnet 47 disposed concentrically below rotor assembly 1 and conductive disc 49 cooperates with permanent magnet 21 in the lower portion of the rotor assembly to exert a smaller amount of force on the rotor assembly tending to pull it downward. The relative forces exerted by electromagnet assembly 29 and permanent magnet 47 are so proportioned as to yield a net upward force just sufficient to support the rotor assembly in the desired position. Any tendency for the rotor assembly to be displaced axially either upward or downward is counteracted, as hereinbefore explained, by the operation of the photoelectric control circuit comprising light source 35, the optical system comprising lenses 37 and prism 39, photocell 41, integrating circuit 47 and amplifier 33, which controls the current supplied through winding 33 of electromagnet assembly 29. By reason of the provision of the lower permanent magnet 47, the "stiffness" of the system is increased and, as hereinbefore pointed out, any tendency toward nutation of the rotor assembly is reduced. Such action is further enhanced by the damping effect obtained by inclusion of the conductive element 49 interposed between permanent magnets 21 and 47. As a result, undesired resonances of the rotor assembly are reduced as its speed is increased, and it is possible, using a motor system of the sort described in my aforementioned copending application Ser. No. 695,507, to achieve exceedingly high speeds of rotation of the rotor assembly up to 100,000 rpm and even in excess thereof.

While the embodiment of the invention described does not shown any specific application therefor, as hereinbefore mentioned systems in accordance with the invention are useful in numerous applications such as for turbo-pumps, ultra-centrifuges, momentum storage systems, systems for testing and balancing rotating objects, laser scanners and the like. It will be apparent that in any such specific application, suitable structure may be provided for coupling the rotor assembly of the system in accordance with the invention to the apparatus to be driven thereby, and various suitable arrangements for accomplishing this purpose, depending upon the circumstances, will be apparent to those skilled in the art.

While the invention has been described with reference to a single preferred embodiment thereof, it will be apparent that numerous modifications and alternative structures may be devised by those skilled in the art within the scope of the invention as defined by the following claims:

What is claimed is:

1. In a magnetically suspended high speed rotor system comprising a rotor assembly and electric motor means for producing rotation of said rotor about an axis thereof,
    (a) electromagnetic means disposed near one end of said rotor, said means being energizable in response to electric current supplied thereto to exert an attractive force on said rotor to support it,
    (b) a first permanent magnet affixed to said rotor near the opposite end thereof, said magnet being polarized in a direction substantially parallel to said axis of rotation,
    (c) a second permanent magnet disposed in juxtaposition to said first magnet, said second magnet being polarized so as to cooperate with said first magnet and exert an attractive force on said rotor tending to oppose the force exerted by said electromagnetic means,
    (d) means responsive to displacement of said rotor in the direction of its axis of rotation for controlling the current supplied to said electromagnetic means so as to tend to restore said rotor to its position prior to such displacement, and
    (e) a conductive element positioned between said first and second permanent magnets so as to have eddy currents induced therein upon the occurrence of any nutation of said opposite end of said rotor relative to said second permanent magnet, whereby said nutation is effectively damped.

2. A system according to claim 1 including a third permanent magnet affixed to said rotor near said one end thereof and polarized so as to cooperate with said electromagnetic means to support said rotor.

3. A system according to claim 2 in which said rotor comprises a body portion of non-magnetic material having the form of a solid of revolution, having cavities formed in opposite ends thereof substantially concentric with its axis of rotation and having said first and third permanent magnets inserted in said cavities respectively adapted to cooperate with said electromagnetic means and said second permanet magnet.

4. A system according to claim 3 in which said permanent magnets inserted in said cavities are of annular form.

5. A system according to claim 3 in which said permanent magnets inserted in said cavities are made of a rare earth magnetic alloy.

6. A system according to claim 3 in which said body portion of said rotor is formed with an annular slot transverse to the axis of rotation and intermediate the ends of said body portion for accommodating motor stator windings for effecting rotation of said rotor assembly.

7. A system according to claim 6 including a plurality of permanent magnets inserted in holes in said body portion on the opposing faces of said annular slot, said magnets being positioned at substantially equal intervals circumferentially around the axis of said body portion and being polarized along the axis of rotation of said rotor for cooperation with a motor stator winding positioned within said slot.

8. A system according to claim 7 including discs of magnetically permeable material disposed in said cavities respectively between said motor magnets and said first and third magnets.

9. Apparatus according to claim 4 including retaining rings of non-magnetic material inserted in said cavities between the outer surfaces of said permanent magnets and the inner circumferential surfaces of said cavities.

10. A system according to claim 4 in which at least one of said annular permanent magnets is divided into segments formed by radial cuts through the body thereof.

11. A system according to claim 1 in which said electromagnetic means comprises an electromagnet having a core and an associated winding and having a diameter substantially greater than its thickness measured in the direction of the axis of rotation of said rotor.

* * * * *